United States Patent [19]
Davis

[11] Patent Number: 5,333,477
[45] Date of Patent: Aug. 2, 1994

[54] VEHICLE PARKING BOOT

[76] Inventor: Phillip Davis, 336 S. 19th St., Philadelphia, Pa. 19103

[21] Appl. No.: 95,089

[22] Filed: Jul. 20, 1993

[51] Int. Cl.$^5$ .............................................. B62H 5/16
[52] U.S. Cl. ........................................ 70/226; 70/14; 188/32
[58] Field of Search ...................... 70/14, 18, 19, 225, 70/226, 259; 188/32

[56] References Cited

U.S. PATENT DOCUMENTS

| 3,695,071 | 10/1972 | West | 70/18 X |
| 4,723,426 | 2/1988 | Beaudoin | 70/18 X |
| 4,819,462 | 4/1989 | Apsell | 70/226 X |
| 4,854,144 | 8/1989 | Davis | 70/226 |
| 5,214,944 | 6/1993 | Wolthoff | 70/226 |

FOREIGN PATENT DOCUMENTS

| 343814 | 11/1989 | European Pat. Off. | 70/226 |
| 2095191 | 9/1982 | United Kingdom | 70/259 |
| 2110175 | 6/1983 | United Kingdom | 70/226 |

Primary Examiner—Peter M. Cuomo
Assistant Examiner—Suzanne L. Dino

[57] ABSTRACT

A lightweight vehicle immobilization device useful to prevent theft of a vehicle or to prevent driving of said vehicle by its owner having a hub shield, an adjustable arm, a upper arm and a lower arm, each of said arms having ends which are adapted to traverse the tread of a tire of said vehicle and engage the inside of said tire so as to prevent removal of said device when said device is adjusted to the circumference of said tire; the improvement comprising means on said hub shield to limit the degree of outward rotation of said upper and lower arm to about 120 degrees when engaged on said tire, and a wedge shaped member having two surfaces which are about 120 degrees from each other, said wedge shaped member adapted to slide on said adjustable arm and, when locked in position, functioning to prevent inward rotation of said upper arm and said lower arm and to prevent movement of said adjustable arm.

7 Claims, 3 Drawing Sheets

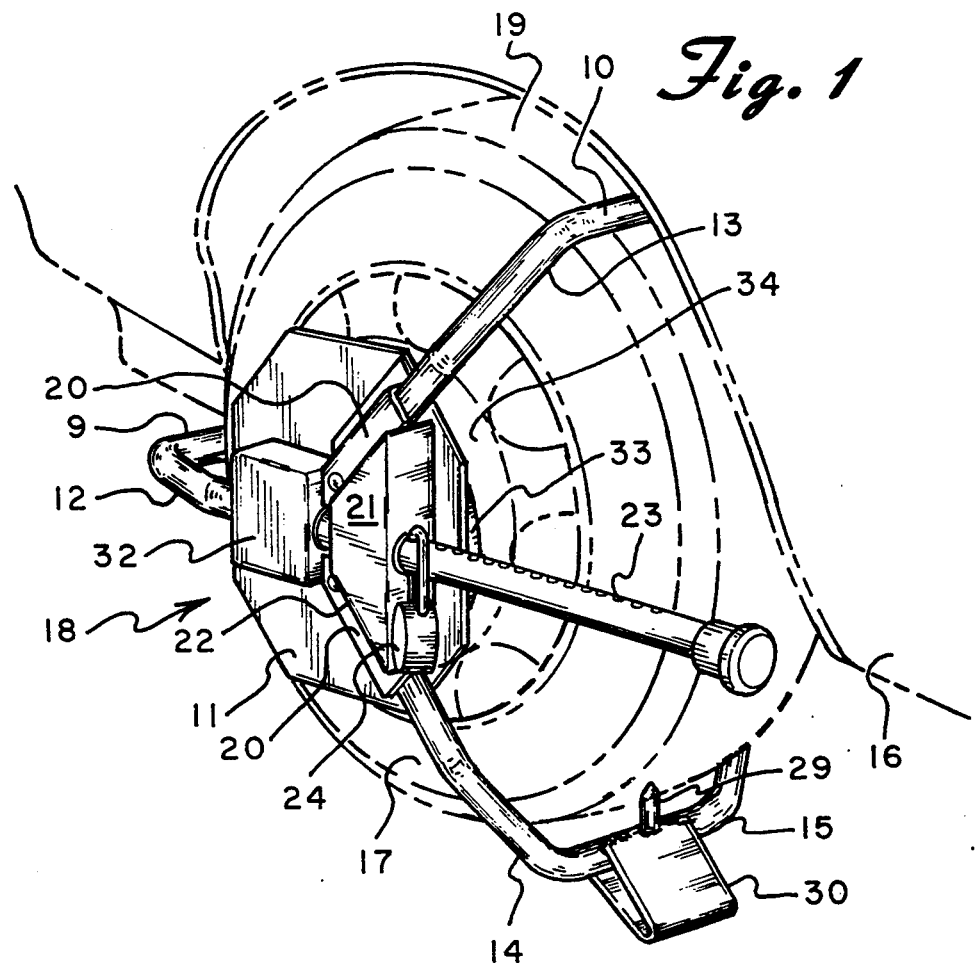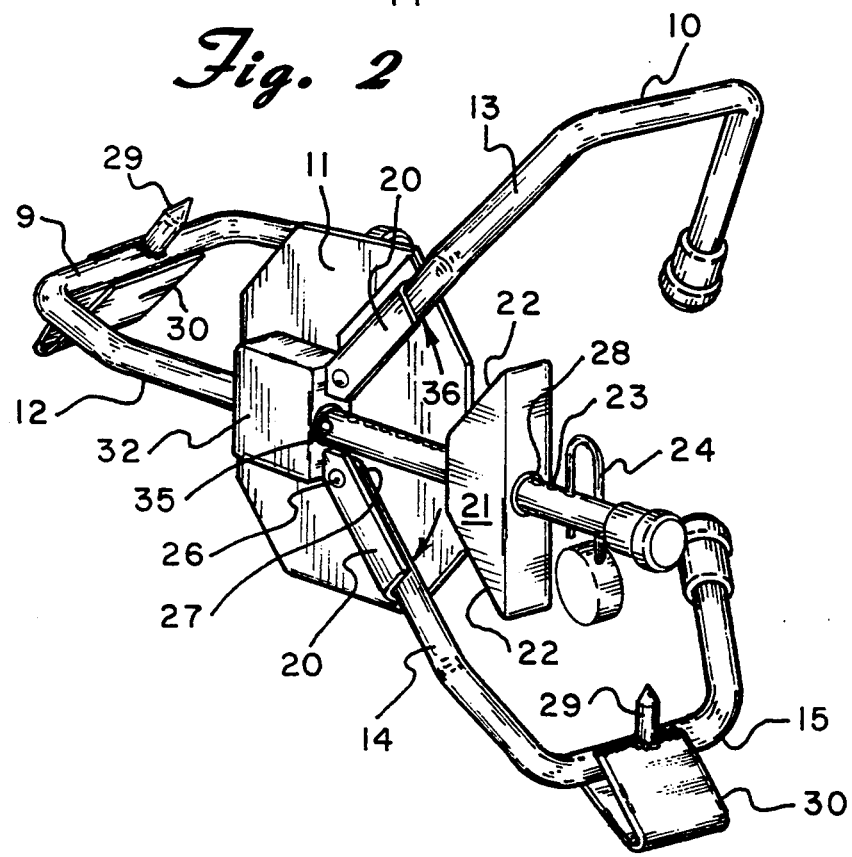

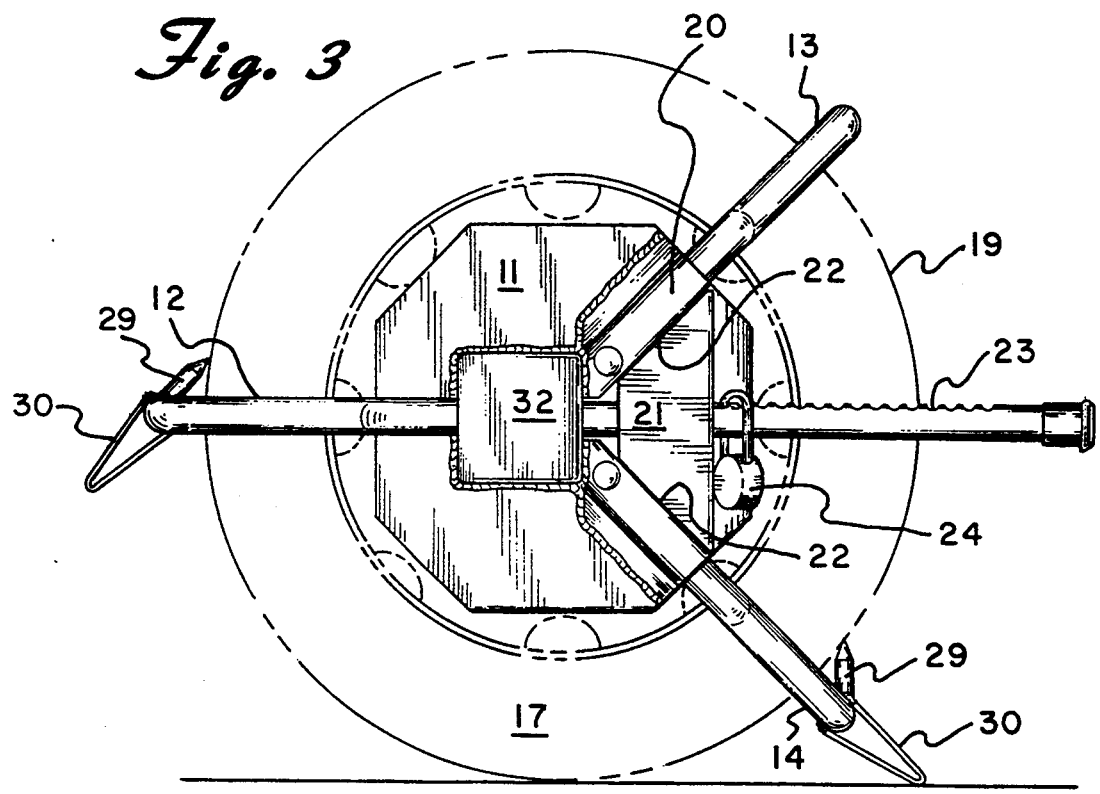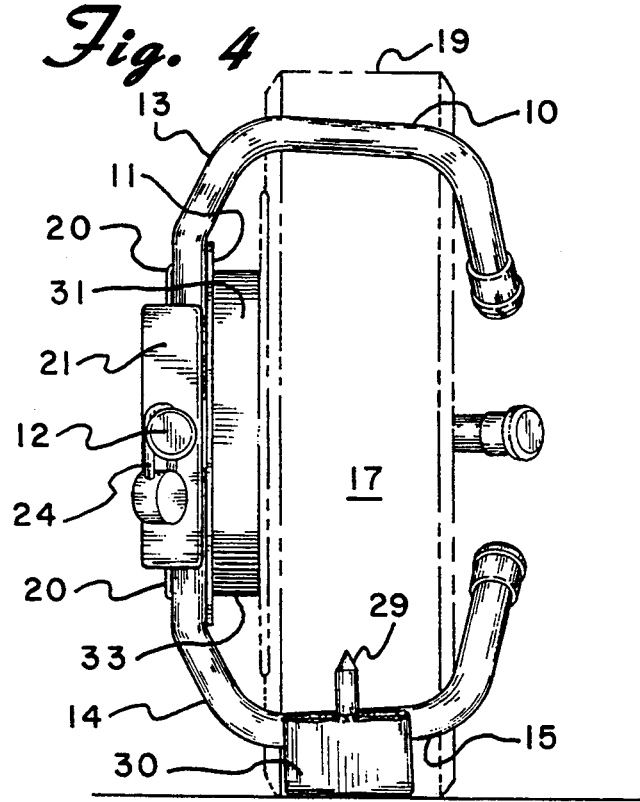

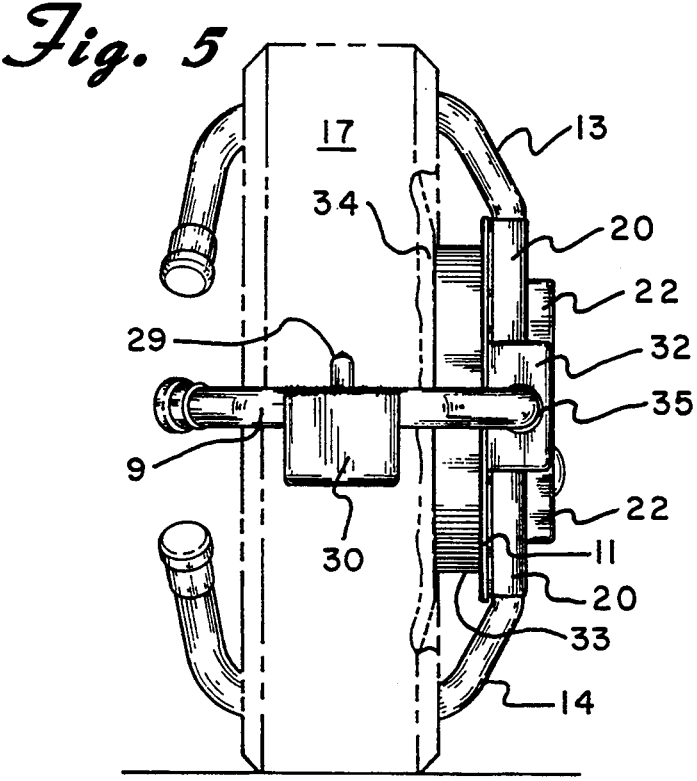
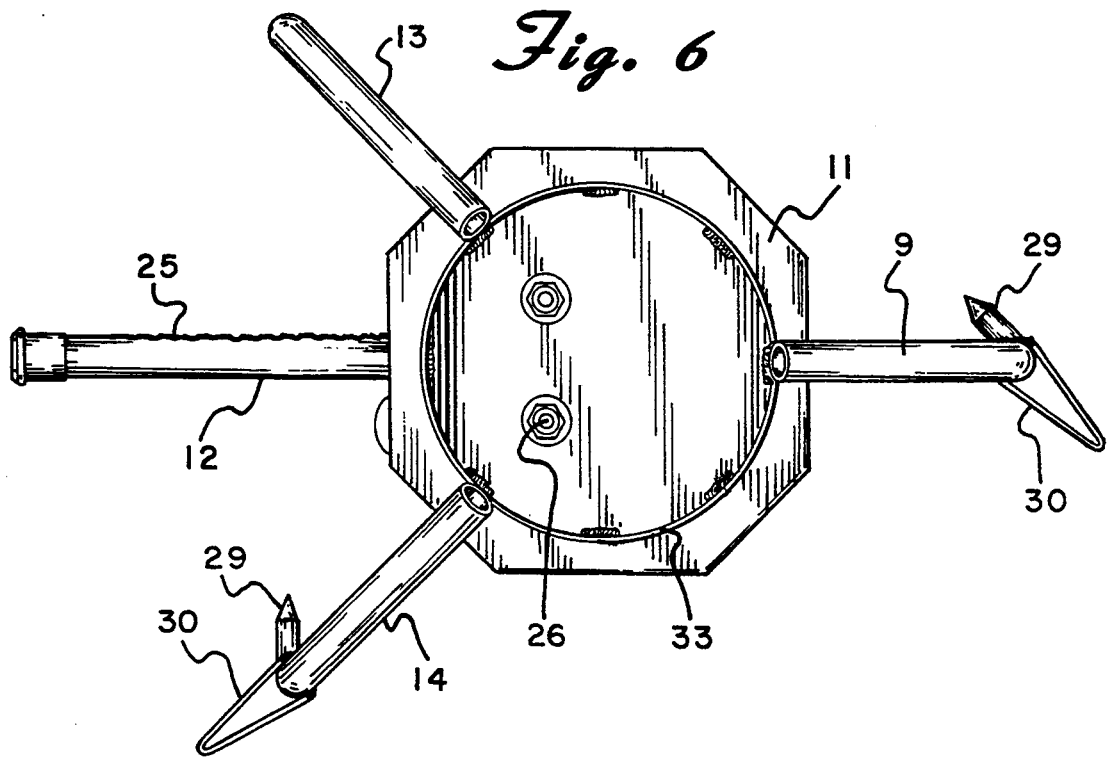

VEHICLE PARKING BOOT

BACKGROUND OF THE INVENTION

1. Field of the Invention

This invention is in the field of vehicle parking boots which are useful for preventing unauthorized driving of a motor vehicle.

2. Description of the Prior Art

Various devices have been used or proposed for immobilizing vehicles from unauthorized movement, the most successful of which has been the lightweight device described and claimed by me in U.S. Pat. No. 4,854,144 of Aug. 8, 1989.

Other wheel locking devices, some of which are known as "Denver Boots," are shown in the references cited in my prior, aforementioned patent application.

My prior patented device has an adjustable arm which slides in a housing to open and close the device for application and removal, which locks in the immobilizing position, and which is interconnected to two articulating arms which traverse the tire tread and engage the inside of the tire in the immobilizing position. While said device has been commercially successful, due to the interconnection between the adjustable arm and the articulating arms, when said device is applied to different size tires, the angle between the three arms when the device is in the locked position is different, i.e., for larger tires, the angle between the "left" ("upper") and "right" ("lower") articulating arms is greater than 120 degrees, whereas for smaller tires, the angle turns out to be substantially less than 120 degrees because the adjustable arm does not extend as far as with normal or larger tires. I have found that as close to 120 degrees as possible is preferred because the device is less secure against unauthorized removal when the arms are at other angles.

The problem in the art has been that no one has proposed or used a device which is light weight, very secure, quick to apply, and yet useful for a very wide range of tire sizes.

SUMMARY OF THE INVENTION

It is an object of the present invention to provide an improved vehicle parking boot for immobilizing motor vehicles from unauthorized driving.

It is a further object of the invention to provide a device which is useful for locking on a motor vehicle tire to immobilize the vehicle which is light, simple, easy to use, and quick to apply, and very useful for a very wide range of tire sizes.

Another object is to provide an improved vehicle immobilization boot type device having three arms which is has improved resistance to unauthorized removal due to the improved angular relationship between the three arms.

These objects and others which will become apparent from the following disclosure are achieved by the present invention which comprises in one aspect a lightweight vehicle immobilization device useful to prevent theft of a vehicle or to prevent driving of said vehicle by its owner having a hub shield, an adjustable arm, housing integral with said hub shield for slidably mounting said adjustable arm, an upper arm and a lower arm, each of said arms having ends which are adapted to traverse the tread of a tire of said vehicle and engage the inside of said tire so as to prevent removal of said device when said device is adjusted to the circumference of said tire, the improvement comprising means on said hub shield to limit the degree of outward rotation of said upper arm and lower arm to about 120 degrees when engaged on said tire, and a wedge shaped member having two surfaces which are about 120 degrees from each other, said wedge shaped member adapted to slide on said adjustable arm and, when locked in position, functioning to prevent inward rotation of said upper arm and said lower arm and to prevent movement of said adjustable arm.

BRIEF DESCRIPTION OF THE DRAWINGS

FIG. 1 is a side perspective view of the wheel locking device of the invention, shown applied to a wheel of a motor vehicle in a locked position.

FIG. 2 is a side perspective view of the wheel locking device of the invention in an open, unlocked position.

FIG. 3 is a side elevational view of the wheel locking device of the invention shown in the locked position.

FIG. 4 is a front elevational view of the wheel locking device of the invention shown in locked position.

FIG. 5 is a rear elevational view of the wheel locking device of he invention shown applied to a wheel.

FIG. 6 is a opposing side elevational view of the device of the invention.

DETAILED DESCRIPTION OF THE INVENTION AND THE PREFERRED EMBODIMENTS

Referring to the drawings, in FIG. 1 is shown a device 18 according to the invention applied to a wheel (shown in phantom) having a hub 34, tire 17, and circumference of tire 19, as part of an automobile 16. The hub shield 11 is relatively flat in the preferred embodiment, but can also have other configurations as long as it is of proper shape to cover at least one lug nut of the hub 34 or, in cases where the hub 34 has a hub cap (not shown), the hub shield would cover it so that it could not be removed by an unauthorized person. Preferably the hub shield 11 is about 12 inches by 12 inches and round or octagon in shape.

The hub shield 11 is preferably metal and has an integral housing 32, preferably box shaped, metal, and welded to the hub shield. The housing 32 has an opening or bushing 35 designed to slidably fit an adjustable arm 12 which would be slid to the left, as illustrated, to open and remove from a wheel, or to the right to apply to a wheel for immobilizing.

Also mounted on the hub shield 11 are an upper arm 13 and a lower arm 14, which are each rotatably mounted on pins 26 through holes 27 in the ends of the upper 13 and lower 14 arms. The outward rotation of said upper 13 and lower 14 arms is limited by means 20 which are preferably L-shaped and faced inwardly. Said means 20 are preferably metal and welded to the hub shield at positions which are about 120 degrees 36 to each other so as to become integral and securely connected. The angle of about 120 degrees is very important because I have found that when that angle is maintained, an unauthorized person cannot defeat the device, even if said person resorts to deflating the tires as has been done to defeat other designs of wheel immobilization devices. The stopping means 20 are strong enough to resist attempts by unauthorized persons to spread the upper 13 and lower 14 arms apart in attempts to remove the device 18 from the wheel.

The adjustable 12, upper 13, and lower 14 arms each have ends 9, 10, and 15, respectively, which are adapted to traverse the tread of the tire 17 when the device 18 is applied. Preferably the ends 9, 10, and 15 are U-shaped, and in the preferred embodiment have 20, 70 and 75 degree bends which cause the side walls of the tire to contact the legs. Traverse portions 15 and 9 in the preferred embodiment each have a heel 30 and a spike 29 to help foil attempts to drive the vehicle while the device 18 is applied.

Wedge shaped member 21 has two surfaces 22 which are about 120 degrees in relation to each other and has a bushing, hole or slot 28 adapted to slidably fit the adjustable arm 23 and to fit against the L-shaped members 20 when the device 18 is in the locked position so as to secure the upper 13 and lower 14 arms from rotational movement. The holes 23 in the adjustable arm 12 are in several positions designed so that whatever the final position of the adjustable arm dictated by the size of the tire 17 to which the device 18 is applied, the wedge can be locked, either by use of a padlock 24 through one of the holes 23, or by a lock integral with the wedge 21 as illustrated in my earlier, aforementioned patent (i.e. a lock cylinder with ball and well type lock, in which case the adjustable arm 12 would have indentations instead of holes 23).

The hub 11 preferably has an inner portion 33 which is a hub shield extension designed to fit against the hub cap or hub area 34 of the wheel 17. The hub shield extension 33 can be of a softer material, if desired, to protect the hub cap or hub 34.

In operation, the device is very simple to apply and remove by an authorized person. The lock 24 is removed (or the lock integral with the wedge in the embodiment not illustrated is unlocked) and the wedge 21 is slid to the right to permit upper arm 13 and lower arm 14 to be rotated inwardly toward each other, and adjustable arm 12 to be slid out toward the left, as illustrated. To apply the device, upper adjustable arm 12 is pushed to the lower, the left 13 and right 14 arms are spread, the wedge 21 is pushed up against the L-shaped members 20, and the wedge 21 is locked in place, for example by use of the padlock 24 through holes 23.

While the invention and the preferred embodiments have been described with particularity herein, various alternative embodiments, modifications, and improvements should become readily apparent to those skilled in the art without departing from the spirit and scope of the invention.

What is claimed as my invention is:

1. In a lightweight vehicle immobilization device useful to prevent theft of a vehicle or to prevent driving of said vehicle by its owner having a hub shield, an adjustable arm, housing integral with said hub shield for slidably mounting said adjustable arm, a upper arm and a lower arm, each of said arms having ends which are adapted to traverse the tread of a tire of said vehicle and engage the inside of said tire so as to prevent removal of said device when said device is adjusted to the circumference of said tire; the improvement comprising means on said hub shield to limit the degree of outward rotation of said upper arm and lower arm to about 120 degrees when engaged on said tire, a wedge shaped member having two surfaces which are about 120 degrees from each other, said wedge shaped member adapted to slide on said adjustable arm and, when locked in position functioning to prevent inward rotation of said upper arm and said lower arm and to prevent movement of said adjustable arm, and means disposed on said adjustable arm to lock said wedge against said upper arm and said lower arm.

2. Device according to claim 1 wherein said means disposed on said adjustable arm includes holes adapted for the bolt of a padlock to fit through.

3. Device according to claim 2 wherein said device further including a padlock which, when placed through one of said holes, functions to maintain said wedge in position to prevent inward rotation of said left and right arms.

4. Device according to claim 1 wherein means disposed on said adjustable includes indentations adapted to engage with locking means in said wedge.

5. Device according to claim 1 wherein and said wedge includes locking means to engage and lock said adjustable arm so as to prevent sliding of said wedge and said adjustable arm.

6. Device according to claim 1 wherein said means on said hub shield to limit the degree of outer rotation comprise L-shaped members each having a pin adapted to slide through in an end of said upper and lower arms.

7. Device according to claim 1 wherein said wedge shaped member has a tunnel having a cross section approximating that of the cross section of said adjustable arm.

* * * * *